United States Patent
Kim et al.

(10) Patent No.: US 9,749,814 B2
(45) Date of Patent: Aug. 29, 2017

(54) METHOD AND APPARATUS FOR REDUCING DELAY IN WIRELESS COMMUNICATION SYSTEM SUPPORTING BROADCAST SERVICE

(71) Applicant: Samsung Electronics Co., Ltd., Gyeonggi-do (KR)

(72) Inventors: Dae-Joong Kim, Gyeonggi-do (KR); Jun-Hyuk Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 115 days.

(21) Appl. No.: 14/515,139

(22) Filed: Oct. 15, 2014

(65) Prior Publication Data
US 2015/0103726 A1    Apr. 16, 2015

(30) Foreign Application Priority Data
Oct. 16, 2013    (KR) .................... 10-2013-0123438

(51) Int. Cl.
*H04W 4/06*    (2009.01)
*H04W 28/18*    (2009.01)

(52) U.S. Cl.
CPC ............. *H04W 4/06* (2013.01); *H04W 28/18* (2013.01)

(58) Field of Classification Search
CPC ..... H04W 4/06; H04W 72/005; H04W 56/00; H04W 88/16; H04W 56/002; H04W 72/0406; H04W 76/041; H04W 88/08; H04W 92/045; H04W 76/002
See application file for complete search history.

(56) References Cited

U.S. PATENT DOCUMENTS

| | | | | |
|---|---|---|---|---|
| 7,773,556 B2 * | 8/2010 | Jung | ................... | H04W 72/005 370/328 |
| 8,437,371 B2 * | 5/2013 | Wang | .................. | H04W 56/002 370/338 |
| 8,521,141 B2 | 8/2013 | Aguirre et al. | | |
| 8,665,791 B2 * | 3/2014 | Ha | ...................... | H04W 76/041 370/310 |
| 2005/0007971 A1 * | 1/2005 | Jeong | ................... | H04L 12/189 370/312 |
| 2008/0019293 A1 * | 1/2008 | Chang | ................... | H04W 88/16 370/310 |
| 2009/0067452 A1 * | 3/2009 | Filipovic | ............... | H04J 3/0682 370/503 |

(Continued)

OTHER PUBLICATIONS

3GPP TS 25.446 V10.2.0 (Dec. 2011) 3rd Generation Partnership Project; Technical Specification Group Radio Access Network; MBMS synchronisation protocol (SYNC) (Release 10) pp. 20.

(Continued)

*Primary Examiner* — Sai Aung
(74) *Attorney, Agent, or Firm* — The Farrell Law Firm, P.C.

(57) ABSTRACT

A method and an apparatus are provided for reducing a delay in a wireless communication system supporting a broadcast service. A message including last timestamp information is received from one or more eNBs in a broadcast service area. An eNB is determined that has received a packet with a longest delay, among the one or more eNBs based on the last timestamp information. A new offset of a system frame number is determined using the last timestamp information of the eNB. The new offset of the system frame number is transmitted to the one or more eNBs.

12 Claims, 3 Drawing Sheets

(56) References Cited

U.S. PATENT DOCUMENTS

| | | | | |
|---|---|---|---|---|
| 2009/0316665 A1* | 12/2009 | Adjakple | .......... | H04W 56/0015 |
| | | | | 370/336 |
| 2012/0026929 A1* | 2/2012 | Wang | .................. | H04W 72/005 |
| | | | | 370/312 |
| 2013/0100832 A1* | 4/2013 | Flinn | ................... | H04L 43/0852 |
| | | | | 370/252 |
| 2013/0343365 A1* | 12/2013 | Hollabaugh | .......... | H04W 56/00 |
| | | | | 370/338 |

OTHER PUBLICATIONS

3GPP TS 36.331 V10.1.0 (Mar. 2011) 3rd Generation Partnership Project; Technical Specification Group Radio Access Network; Evolved Universal Terrestrial Radio Access (E-UTRA); Radio Resource Control (RRC); Protocol specification (Release 10) pp. 285.

\* cited by examiner

METHOD AND APPARATUS FOR REDUCING DELAY IN WIRELESS COMMUNICATION SYSTEM SUPPORTING BROADCAST SERVICE

PRIORITY

This application claims priority under 35 U.S.C. §119(a) to a Korean patent application filed in the Korean Intellectual Property Office on Oct. 16, 2013 and assigned Serial No. 10-2013-0123438, the content of which is incorporated herein by reference.

BACKGROUND OF THE INVENTION

1. Field of the Invention

The present disclosure relates generally to a wireless communication system, and more particularly, to a method and an apparatus for reducing the delay that occurs in a wireless communication system supporting a broadcast service.

2. Description of the Related Art

With the development of multimedia broadcast/communication technology capable of providing mass multimedia services, a broadcast service can be provided to a plurality of User Equipments (UEs). An example of a typical broadcast service is a Multimedia Broadcast/Multicast Service (MBMS).

MBMS is a broadcast service that supports transmission of various types of multimedia such as, for example, real-time videos, audios, still images and texts. MBMS is also a broadcast service that can provide audio data and video data at the same time. A large amount of transmission resources are required for MBMS. MBMS may be serviced over a broadcast channel because of the possibility that a plurality of UEs may exist for the same service.

In addition, a Long Term Evolution (LTE) system proposed in 3$^{rd}$ Generation Partnership Project (3GPP), which is the communication standard group, may provide not only a unicast service that is based on a Point-to-Point (PtP) communication scheme, but also a multicast service that is based on a Point-to-Multipoint (PtM) data transfer scheme. In the LTE system, a multicast data transfer scheme is called 'eMBMS'.

It is assumed herein that the wireless communication system is an LTE system, and the term 'MBMS', as used herein, may refer to the eMBMS.

MBMS may provide the same broadcast service to a plurality of UEs located in a specific area. Herein, an area in which the same broadcast service is provided will be defined as an MBMS Single Frequency Network (MBMSFN) area having one or multiple cells or evolved Node Bs (eNBs). In the MBMSFN area, since broadcast data is synchronized and then transmitted through one or multiple cells, the MBMSFN area may be construed as a network area including one or multiple eNBs that transmit synchronized broadcast data. Different MBMSFN areas may overlap with one cell. MBMSFN transmission (hereinafter, referred to as MBMS transmission) may require not only time synchronization between cells participating in the MBMSFN area, but also use of the same set of wireless resources by each of the cells.

The MBMS transmission uses a Multicast Channel (MCH), and the MCH includes: a Multicast Traffic Channel (MTCH) which is a logical channel for transmitting broadcast data of each MBMS; and a Multicast Control Channel (MCCH) which is a logical channel for transmitting control information necessary for reception of broadcast data of each MBMS.

Transmission of the MCH may accompany MCH Subframe Allocation (MSA), and the MSA may be periodically performed at the beginning of each MCH Scheduling Period (MSP). MSP, specified in the 3GPP standard, may have a range of, for example, 80 milliseconds (ms) to 10.24 seconds (s). In the MCH transmission, an MCCH may be repeatedly transmitted depending on an MCCH repetition period, and may be changed depending on an MCCH modification period.

In the 3GPP standard, the MCCH modification period is specified as, for example, 512 ms or 1024 ms, and due to the MCCH modification period, data transmission of an MBMS session may be randomly delayed for 5.12 seconds or more. This transmission delay may occur only in an MBMS session for MBMS transmission requiring synchronization between eNBs, unlike the unicast traffic, causing a decrease in the quality of service in MBMS. For example, if the user is in a stadium, there may be a large time difference between the video that is displayed on a UE through MBMS, and the actual scene that the user watches in the stadium. In addition, when the user enjoys a Push To Talk (PTT) service or a group call, which is a voice service, through MBMS, a significant delay may occur until the voice of the user is heard by the user.

Since the MCCH modification period is limited to a minimum of 5.12 seconds as stated above, a long time delay of 5.12 seconds or more may occur until the data transmitted from the network is received at the UE. Thus, a time gap of 5.12 seconds or more may occur between the actual scene and the live voice and video received at the UE during the live broadcast through MBMS.

The long time delay is described in detail with reference to FIGS. 1A and 1B. FIG. 1A is a diagram illustrating a case in which a packet is transmitted without a significant delay since the data transmitted from a Broadcast Multicast Service Center (BMSC), which is a broadcast server, arrives at an eNB just before an MTCH is opened. On the other hand, FIG. 1B is a diagram illustrating a case in which a significant packet delay occurs if an MTCH channel is opened about 5 seconds after the data transmitted from the BMSC is received at the eNB. The packet delay as in FIG. 1B may occur because the BMSC does not correctly know the time the eNB prepares wireless resources and opens an MTCH.

In addition, even though the BMSC can estimate the time the eNB opens an MTCH, the significant packet delay, as shown in FIG. 1B, may occur because a packet may hardly arrive at an eNB in a predetermined time due to a delay occurring in a backhaul. A packet transmission time should be matched between eNBs, but all of the eNBs may be different in terms of the time each eNB receives a packet from the BMSC, due to the backhaul delay.

Because the eNBs are all different in terms of the time that each eNB receives a packet from the BMSC, in order to match the packet transmission time among the eNBs, a Multi-cell multicast Coordination Entity (MCE) may determine an MCCH update time and provide information about the determined MCCH update time to all eNBs in the MBMSFN area. Each eNB may open an MTCH (session) depending on the MCCH update time determined by the MCE, and start transmitting the packet sent by the BMSC.

When transmitting MBMS data, each eNB may determine the time it transmits the data, based on the timestamp value in the MBMS data. For example, if a timestamp value is '10' and an offset value of a System Frame Number (SFN) is 512, then the eNB may transmit the packet when an SFN value is 522 (=512+10). The MCCH update time determined by the MCE may be determined as the closest MCCH modification boundary depending on the MCCH modification period (e.g., 5.12 seconds, 10.24 seconds, etc.), considering an MCCH notification time period. If the MCCH update time is determined in this way, MBMS data of the relevant session may be transmitted from that time on.

SUMMARY OF THE INVENTION

The present invention has been made to address at least the above problems and/or disadvantages and to provide at least the advantages described below. Accordingly, an aspect of the present invention provides a method and an apparatus for reducing the time delay, during which transmitted data arrives at an eNB, in a wireless communication system supporting MBMS.

Another aspect of an embodiment of the present invention provides a method and an apparatus for reducing the data transmission time delay, which occurs due to a limitation of an MCCH modification period, in a wireless communication system supporting MBMS.

Another aspect of the present invention provides a method and an apparatus for matching MBMS data transmission synchronization between cells or between eNBs in an MBMSFN area in a wireless communication system supporting MBMS.

In accordance with an aspect of the present disclosure, a method is provided for reducing a delay in a wireless communication system supporting a broadcast service. A message including last timestamp information is received from one or more eNBs in a broadcast service area. An eNB is determined that has received a packet with a longest delay, among the one or more eNBs based on the last timestamp information. A new offset of a system frame number is determined using the last timestamp information of the eNB. The new offset of the system frame number is transmitted to the one or more eNBs.

In accordance with another aspect of the present invention, a server is provided in a wireless communication system supporting a broadcast service. The server includes a communication interface configured to transmit and receive messages for provision of the broadcast service, and to transmit broadcast data. The server also includes a controller configured to receive a message including last timestamp information from one or more eNBs in a broadcast service area. The server is also configured to determine an eNB that has received a packet with a longest delay, among the one or more eNBs based on the last timestamp information. The server is further configured to determine a new offset of a system frame number using the last timestamp information of the eNB, and transmit the new offset of the system frame number to the one or more eNBs.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1A:
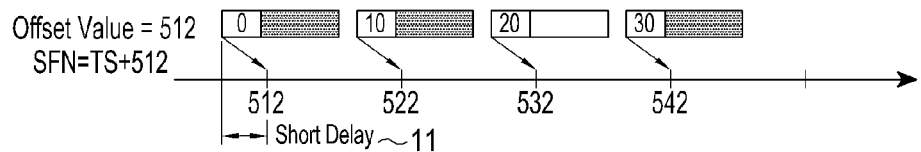
FIGS. 1A and 1B are diagrams illustrating time delays occurring in a broadcast service.
Figure 1B:
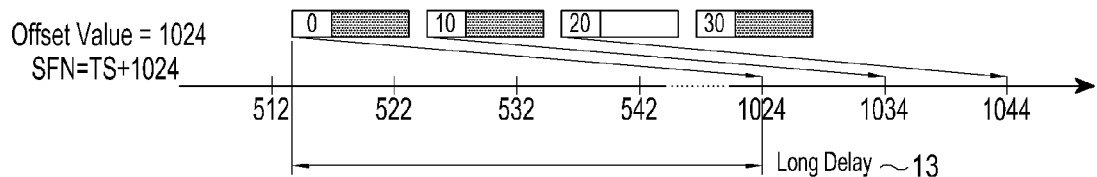

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description are not limited to their dictionary meanings, but are merely used to enable a clear and consistent understanding of the disclosure. Accordingly, it should be apparent to those skilled in the art that the following description of embodiments of the present invention is provided for illustration purposes only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An embodiment of the present invention provides a delay reduction method for discarding packets buffered in eNBs to reduce the time delay that occurs due to a limitation of an MCCH modification period in MBMS.

Figure 2:
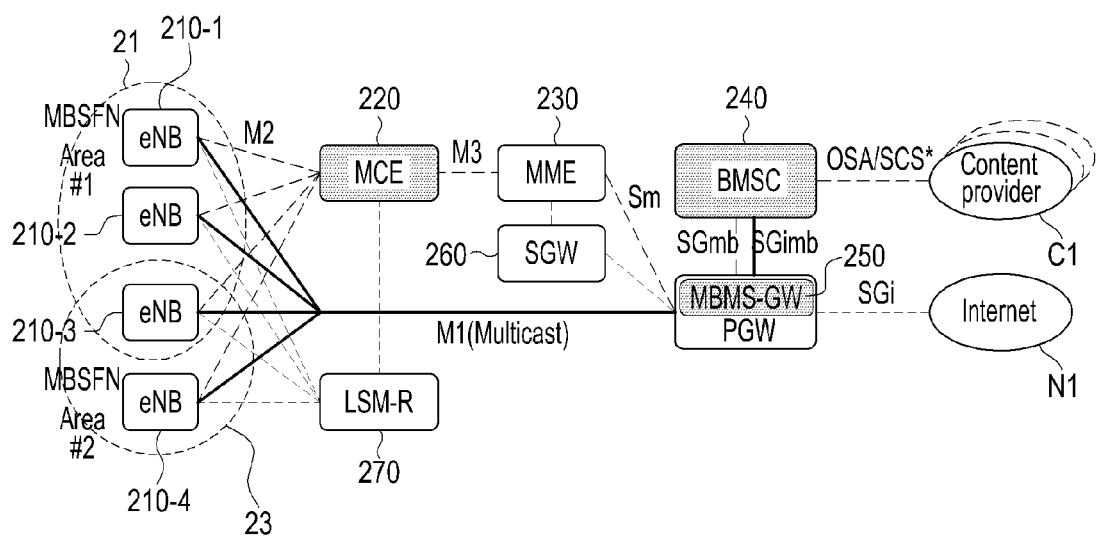
FIG. 2 is a diagram illustrating a configuration of a wireless communication system supporting MBMS, according to an embodiment of the present invention.

FIG. 2 is a diagram illustrating a configuration of a wireless communication system supporting MBMS, according to an embodiment of the present invention. Specifically, FIG. 2 illustrates a system configuration supporting MBMS in the LTE system.

The system of FIG. 2 includes multiple eNBs 210-1, 210-2, 210-3, 210-4 for transmitting MBMS data in their MBMSFN areas to undepicted UEs located in MBMSFN areas 21 and 23, a Multi-cell/multicast Coordination Entity (MCE) 220, a Mobility Management Entity (MME) 230, a Broadcast Multicast Service Center (BMSC) 240, a MBMS-GateWay (MBMS-GW) 250, a Serving GW (SGW) 260, and an LTE System Manager for RAN (LSM-R) 270. Although it is assumed in FIG. 2 that multiple eNBs 210 exist in the MBMSFN areas, one or multiple eNBs may exist in one MBMSFN area.

In FIG. 2, data traffic of MBMS content provided from a content provider C1 may be transmitted to UEs via the BMSC 240, the MBMS-GW 250, and the eNBs 210-1 to 210-4. The MCE 220 may not only control the time synchronization between cells participating in the MBMSFN areas 21 and 23, but may also control the eNBs 210-1 to 210-4 so that the eNBs 210-1 to 210-4 may use the same set of wireless resources in each of the cells. In FIG. 2, the same MBMS data may be transmitted to the UEs located in the same MBMSFN area. To this end, the MCE 220 may control synchronization, resource allocation and signaling of transmission parameters in the MBMSFN areas 21 and 23.

In FIG. 2, the BMSC 240, which is a broadcast server, may control a data flow for MBMS data in a core network, and may be responsible for authorization and authentication for the content provider C1. The MBMS-GW 250 may handle multicast transmission of MBMS data from the BMSC 240 to the eNBs 210-1 to 210-4. In FIG. 2, since the other components of MME, SGW, PGW and LSM-R are network entities of the LTE system, which are not particularly related to an embodiment of the present invention, a detailed description thereof will be omitted.

If an MBMS session starts, the BMSC 240 may periodically transmit MBMS data to the eNBs 210-1 to 210-4 in units of predetermined synchronization sequences. If there is no MBMS data to transmit, the BMSC 240 may record only the timestamp in an empty packet having no user data, and transmit the packet.

In this case, the eNBs 210-1 to 201-4 may continue to receive the empty packets, a timestamp in which increases in units of a predetermined value. The eNBs 210-1 to 201-4 may each calculate a System Frame Number (SFN) that is determined based on a sum of a timestamp and an offset value in the MBMSFN area, and broadcast a packet of MBMS data at a time corresponding to the calculated SFN. In this case, if the broadcast packet is empty, the eNB may not transmit the packet at that time. Therefore, all packets of the MBMS session may undergo the same transmission delay from the moment a first timestamp of the MBMS session is bound to a specific SFN, till the MBMS session is terminated.

To reduce the packet transmission delay in the MBMS session, an embodiment of the present invention provides a method of discarding packets previously buffered in the eNBs on the basis of a timestamp of the packet that an eNB, which has received packets with the longest delay, has most recently received, among the eNBs in an MBMSFN area, and of transmitting packets beginning with the most recently received packet. The eNBs 210-1 to 210-4 may adjust an offset value that they use when calculating an SFN, from the timestamp.

Operations of the BMSC 240, the MCE 220 and the eNBs 210-1 to 210-4, which are performed for adjustment of the offset value, are described in greater detail below.

While transmitting a session start message to the MCE 220, the BMSC 240 may set a minimum waiting time Minimum_Time_to_MBMS_Data_Transfer for transmission of MBMS data so that the eNBs 210-1 to 210-4 may set wireless resources. The session start message transmitted by the BMSC 240 may be delivered to the MCE 220 via the MME 230. During the minimum waiting time Minimum_Time_to_MBMS_Data_Transfer, all the eNBs 210-1 to 210-4 in the MBMSFN area may perform session configuration and radio resource configuration for transmitting MBMS data, and perform multicast join. If the minimum waiting time Minimum_Time_to_MBMS_Data_Transfer has elapsed, the BMSC 240 may start transmitting the MBMS data.

To this end, in an embodiment of the present invention, the BMSC 240 may set the minimum waiting time Minimum_Time_to_MBMS_Data_Transfer to, for example, zero (0). After transmitting the session start message, the BMSC 240 may transmit an empty packet by counting the timestamp beginning at 0. An MBMS packet that is transmitted at an initial transmission time is highly likely to be lost while the MBMS packet undergoes time shifting in the eNBs 210-1 to 210-4. A session preparation time in which a packet is highly likely to be lost due to the time shifting may be about 11 seconds (e.g., MCCH Modification Notification of 5.12 seconds (i.e., MCCH modification period)+ Worst_Packet_Arrival_Case of 5.12 seconds) after the BMSC 240 transmits the session start message. The packets transmitted after the session preparation time may not be lost by the time shifting in the eNBs 210.

The MCE 220 may perform an adaptive delay reduction function of reducing a delay by adjusting an offset value, according to an embodiment of the present invention, for the session in which the minimum waiting time Minimum_Time_to_MBMS_Data_Transfer is set to 0. The procedure in which the MCE 220 that has received the session start message from the BMSC 240 via the MME 230 transmits the session start message to the eNBs 210, and delivers scheduling information to the eNBs 210-1 to 210-4 may be performed in the same way as that of the normal eMBMS session specified in the 3GPP LTE system.

However, for the session on which the MCE 220 performs the adaptive delay reduction function, the MCE 220 may transmit the session start message, and then transmit a last timestamp information request LastTimeStamp_Info_Request message to a relevant eNB 210-1, and in response thereto, the MCE 220 may receive, from the eNB 210-1, a last timestamp information response LastTimeStamp_Info_Response message including at least one of a last timestamp LastTimeStamp that the eNB 210-1 has most recently received, a current SFN CurrentSFN, a synchronization sequence size, and an MSP value.

The MCE 220 may calculate an offset value in accordance with Equation (1) below using the last timestamp LastTimeStamp and the current SFN CurrentSFN, which the MCE 220 has collected from the eNBs 210-1 to 210-4 that have requested the session.

If CurrentSFN≥LastTimeStamp %4096,

Offset=CurrentSFN−(LastTimeStamp %4096);

Else Offset=4096−(LastTimeStamp %4096−CurrentSFN)     (1)

In Equation (1) "%" denotes an operator for obtaining a remainder value. An offset value calculated using Equation (1) means the time (or SFN) that a first packet (with Timestamp=0) of the session has arrived at each eNB 210-1 to 210-4. However, since the SFN may turn around (4096→0) after the start of the session, if a difference between the largest offset and the smallest offset exceeds, for example, 1500 (e.g., 15 seconds; it is assumed that a difference between arrival times of the packets that have arrived at the eNB 210 is not greater than or equal to 15 seconds), the offset value may be adjusted by adding 4096 to a number which is less than 4096.

The MCE 220 may select an eNB 210-1, an offset value of which is calculated as a largest one on the basis of the adjusted offset, and may determine the selected eNB 210-1 as an eNB that receives a packet from the BMSC 240 most delayed, or last. To match content synchronization between the eNBs 210-1 without a packet loss, an embodiment of the present invention time-shifts the SFN on the basis of a packet of the last timestamp LastTimeStamp that the eNB 210-1 having the largest offset value has received. Since a value of the last timestamp LastTimeStamp reported by the eNB 210-1 may correspond to a first packet of the synchronization sequence, a time corresponding to the synchronization sequence may be considered. Because all packets of the synchronization sequence should be transmitted to the eNB 210-1 before the start of the MSP, the MSP value may also be considered. Therefore, the MCE 220 may determine a new SFN offset NewBaseSFN_Offset in accordance with Equation (2) below.

$$NewBaseSFN\_Offset = Offset(largest\ value) + SychronizationSequenceLength + MSP + Margin \quad (2)$$

In Equation (2), Margin denotes a value determined considering a processing delay in the eNB 210-1, and its default value is 20 ms and may be optimized by the operator. The MCE 220 may provide information about the new SFN offset NewBaseSFN_Offset determined in accordance with Equation (2) to each eNB in the MBMSFN area, requesting the eNB 210-1 to change the offset BaseSFN_Offset of the SFN.

After receiving the last timestamp information request LastTimeStamp_Info_Request message from the MCE 220, the eNB 210-1 may determine whether it receives an MBMS packet in the session. If no MBMS packet is received due to a delay of multicast join, the eNB 210-1 may wait for about 1 second. To check a length of the synchronization sequence, the eNB 210-1 may receive an MBMS packet of at least a second synchronization sequence. The eNB 210-1 may obtain an SFN at the moment it receives a desired MBMS packet. The eNB 210-1 may transmit, to the MCE 220, the last timestamp information response LastTimeStamp_Info_Response message including a last timestamp LastTimeStamp that the eNB 210-1 has most recently received, a current SFN CurrentSFN, a synchronization sequence size, and an MSP value. Thereafter, upon receiving a new SFN offset NewBaseSFN_Offset from the MCE 220, the eNB 210-1 may change the current BaseSFN value used by Radio Link Control (RLC), to a new SFN offset value NewBaseSFN_Offset. After the change of the SFN value in the eNB 210-1, the RLC may undergo time shifting for the session and the previously received packets may be discarded.

Figure 3:
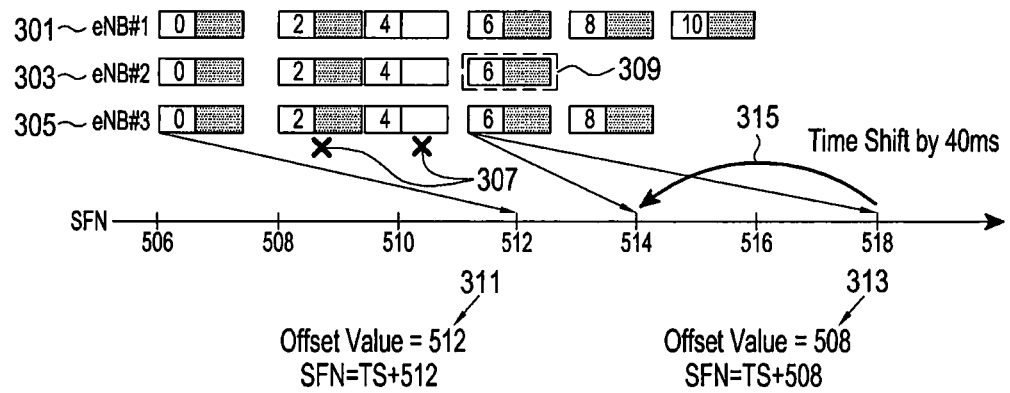
FIG. 3 is a diagram illustrating a scheme of adjusting an offset value in an adaptive delay reduction method, according to an embodiment of the present invention.

FIG. 3 is a diagram illustrating a scheme of adjusting an offset value in an adaptive delay reduction method, according to an embodiment of the present invention. Specifically, FIG. 3 illustrates an example in which packets of MBMS data are transmitted from the BMSC 240 to three eNBs, i.e., eNB#1, eNB#2 and eNB#3, belonging to the same MBMSFN area, with different delays. Reference numeral 301 represents packets received at the eNB#1, reference numeral 303 represents packets received at the eNB#2, and reference numeral 305 represents packets received at the eNB#3. A number written on the front of each packet is a timestamp TS of the packet. In FIG. 3, each eNB receives packets having different delays, and the eNB#2 has received packets with the longest delay. Further, in FIG. 3, packets with TS=4 represent empty packets. In the example of FIG. 3, empty packets may or may not exist.

In FIG. 3, reference numeral 307 represents packets (e.g., packets of timestamps "2" and "4"), which are discarded depending on the adjustment of the offset value, according to an embodiment of the present invention.

The proposed scheme of adjusting an offset value to reduce a packet delay is described in greater detail below. The packet delay may randomly occur due to the delay of up to 5.12 seconds for data synchronization specified in the MBMS standard. To reduce the packet delay, an embodiment of the present invention may find an eNB that has received a packet having the longest delay, and adjust an offset value (e.g., a transmission time of an MBMS data packet) for transmission of an MBMS data packet based on the timestamp of the packet that the found eNB has most recently received. In FIG. 3, the eNB that has received packets with the longest delay is the eNB#2, and the packet that the eNB#2 has most recently received is a packet of the timestamp "6" 309.

In FIG. 3, reference numeral 311 represents a calculated SFN, if the offset value is, for example, 512, which is a value given before it is adjusted. Reference numeral 313 represents a calculated SFN, if an offset value is adjusted to 508 by time-shifting the offset value of 512 by, for example, 40 ms. The reason for shifting the offset value by 40 ms (i.e., 512−508=4) is to send the packets with TS=6 that all of the eNBs (e.g., eNBs #1, #2 and #3) in the same MBMSFN area have received, at the current SFN transmission time (e.g., SFN=514). In alternative embodiment of the present invention, it is also possible to shift the time by a few seconds or more depending on the timestamp value of the last packet that the eNB has received, and the current SFN value. If the number of eNBs in the MBMSFN area is one, it is possible to further reduce the delay time for which packets are buffered in the eNB.

Therefore, on the basis of the packet of the timestamp "6", an offset value for transmission of MBMS data packets of the eNBs eNB#1, eNB#2 and eNB#3 may be adjusted to 508. In a case where an offset value is adjusted considering the packet delay as in the example of FIG. 3, if the offset value is, for example, 512, a packet delay of about 60 ms may occur, whereas if the offset value is adjusted to 508, the packet delay may be reduced to about 20 ms.

Figure 4:
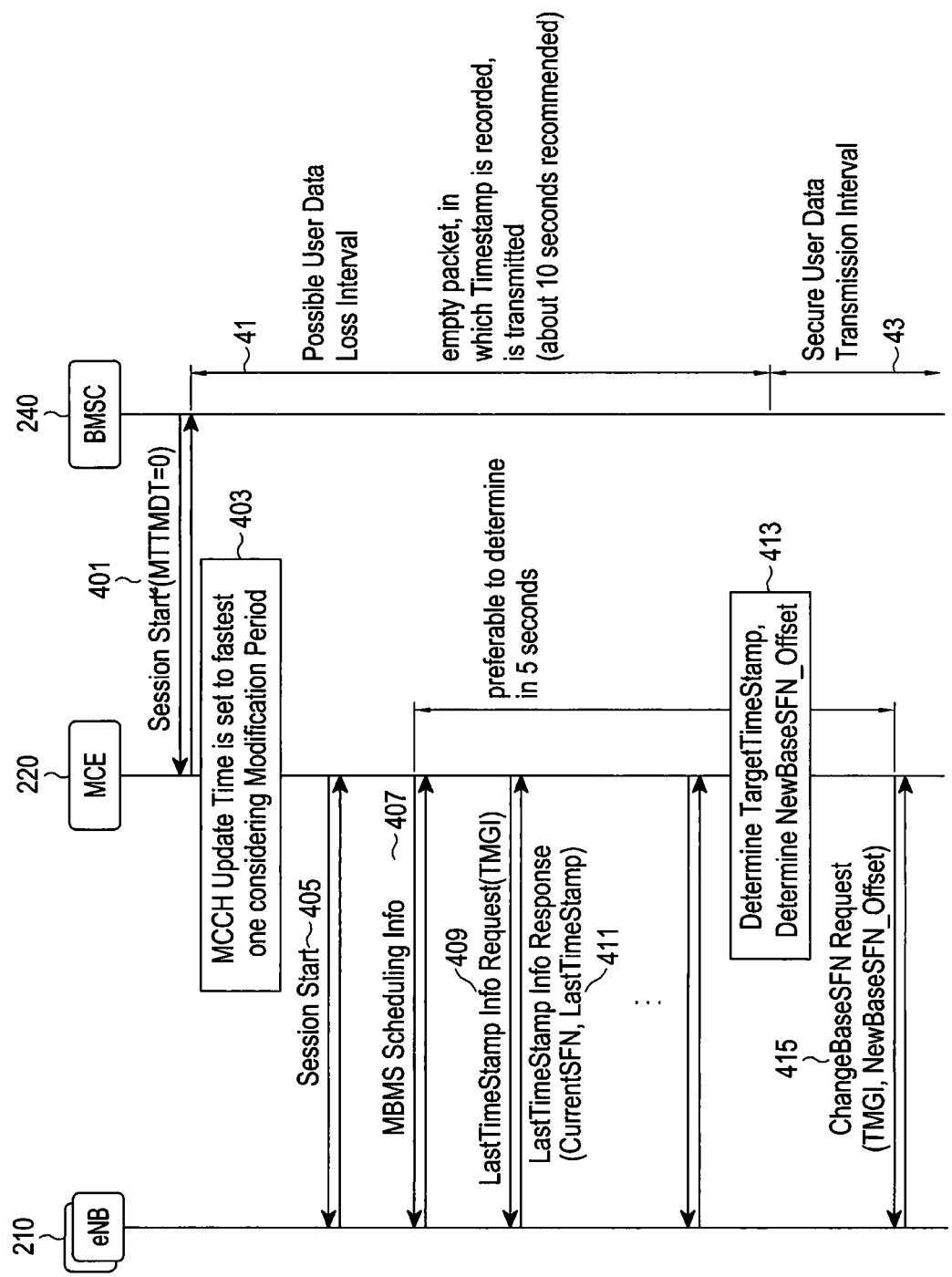
FIG. 4 is a diagram illustrating a method of reducing a delay in a wireless communication system supporting MBMS, according to an embodiment of the present invention.

FIG. 4 is a diagram illustrating a method of reducing a delay in a wireless communication system supporting MBMS, according to an embodiment of the present invention. In FIG. 4, reference numeral 41 represents an interval in which a loss of data packets may occur, and in this interval, empty packets in which a timestamp is recorded may be transmitted. Reference numeral 43 represents an interval in which data packets can be transmitted reliably.

Referring to FIG. 4, in step 401, while transmitting a session start message to the MCE 220 (in this case, the session start message is sent to the MCE via the MBMS-GW, the MME, etc.), the BMSC 240 sets the minimum waiting time Minimum_Time_to_MBMS_Data_Transfer for MBMS data transmission, to zero (0) so that an eNB 210 may set wireless resources. If the minimum waiting time Minimum_Time_to_MBMS_Data_Transfer has elapsed, the BMSC 240 starts transmitting the MBMS data. After transmitting the session start message, the BMSC 240 transmits empty packets by counting the timestamp beginning at zero (0). In the case of a service in which a packet loss is allowed, the BMSC 240 may send valid MBMS data instead of the empty packets.

In step 403, the MCE 220 sets the MCCH update time to the fastest time (e.g., 5.12 seconds, which are the SFN reference time) taking into account the MCCH modification period. In step 405, the MCE 220 transmits the session start message to the eNB 210. In step 407, the MCE 220 performs a procedure for transmitting scheduling information to the eNB 210. Thereafter, in step 409, the MCE 220 transmits a last timestamp information request LastTimeStamp_Info_Request message to the eNB 210 to perform the adaptive delay reduction function proposed in the present disclosure. In step 411, in response thereto, the MCE 220 receives, from the eNB 210, a last timestamp information response LastTimeStamp_Info_Response message including at least one of a last timestamp LastTimeStamp that the eNB 210 has most recently received, a current SFN CurrentSFN, a synchronization sequence size, and an MSP value. In alternative embodiment of the present invention, step 409 may be optional. In this case, even in the absence of the operation in which the MCE 220 transmits the last timestamp information request LastTimeStamp_Info_Request message to the eNB 210, the eNB 210 may transmit, to the MCE 220, a message that includes last timestamp information LastTimeStamp_Info including at least one of a last timestamp LastTimeStamp that the eNB 210 has most recently received, a current SFN CurrentSFN, a synchronization sequence size, and an MSP value. This operation is possible because the eNB 210 knows that delay reduction is needed for the session, and the MCE 220 informs the eNB 210 of the necessity of delay reduction for the session, using the session start message.

Thereafter, in step 413, the MCE 220 calculates an offset value adjusted as in Equation (1), using the last timestamp LastTimeStamp and the current SFN CurrentSFN collected from the eNBs 210. The MCE 220 selects an eNB 210, an offset value of which is calculated as a largest one on the basis of the adjusted offset, and determines the selected eNB 210 as an eNB 210 that has received a packet most delayed, or last (e.g., an eNB that has received a packet having the longest delay). In other words, the MCE 220 determines a TargetTimeStamp. On the basis of the last timestamp LastTimeStamp of the packet that the determined eNB 210 has received, the MCE 220 determines an SFN offset NewBaseSFN_Offset of a new SFN NewBaseSFN by time-shifting the SFN in accordance with Equation (2). Thereafter, in step 415, the MCE 220 provides information about the determined new SFN offset NewBaseSFN_Offset to each eNB 210 in the MBMSFN area, requesting the eNB 210 to change the BaseSFN to the new SFN offset NewBaseSFN_Offset, and upon receiving this request, each eNB 210 discards the previously received packets of the new SFN, thereby reducing the packet delay.

Although not illustrated, each of the BMSC 240, the MCE 220 and the eNB 210 may be implemented to include a controller for controlling the proposed adaptive delay reduction operation, according to the method described in FIGS. 2 to 4, and a communication interface for transmitting and receiving related messages. In addition, each of the BMSC 240 and the MCE 220 may be implemented as a server that is operated in the network. In one embodiment of the present invention, the MCE 220 may be implemented to include a communication interface for transmission/reception of messages for provision of a broadcast service and for delivery of broadcast data, and a controller for controlling an operation of transmitting a message for requesting the last timestamp information from the eNBs in the broadcast service area in which the broadcast service is provided, an operation of receiving a message including the last timestamp information from the eNBs in response to the request message, an operation of determining an eNB that has received a packet having the longest delay among the eNBs based on the last timestamp information, and an operation of transmitting a new system frame number changed using the last timestamp information of the determined eNB, to the eNBs.

In an embodiment of the present invention, the BMSC, the MCE, and the eNB may support the adaptive delay reduction function, and may reduce a delay from the BMSC to the UE to the time determined by Equation (2), for the session in which the minimum waiting time Minimum_Time_to_MBMS_Data_Transfer is set to "0". The network operator may enable or disable the adaptive delay reduction function. If the adaptive delay reduction function is disabled, the procedure from the operation of requesting LastTimeStamp from the eNB by the MCE till the operation of setting a new SFN offset NewBaseSFN_Offset may be omitted. Even for the session being broadcast, the operator may control the delay with the method of changing the "Margin" value. If the operator requests a change in the Margin value through the LSM-R, the LSM-R may perform the adaptive delay reduction procedure. In this case, the "Margin" value can be changed to a positive (+) value or a negative (−) value (e.g., −10 seconds to +10 seconds), so the "Margin" value can be controlled to deliberately delay packets, or to remove the delay.

The method in which the BMSC informs the MCE of the session to which the adaptive delay reduction function is to be applied may inform the MCE of the session to which the adaptive delay reduction function is to be applied, using a scheme of including or inserting separate parameter or flag in the session start message, in addition to the method of setting the minimum waiting time Minimum_Time_to_MBMS_Data_Transfer to zero (0).

Although MBMS provided in the LTE system has been described by way of example in an embodiment of the present invention, embodiments of the present invention may be applied in the same or similar way to various broadcast/communication systems that can time-shift the SFN by adjusting the offset in the above-describe manner.

Therefore, according to the proposed delay reduction method, it is possible to dramatically reduce the time delay that the user may experience in the MBMS-based live broadcast or the PTT service. As for this delay reduction effect of embodiments of the present invention, the user may further experience the effect in the stadium where the live broadcast takes place, or in the PTT service.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for reducing a delay in a wireless communication system supporting a broadcast service, the method comprising the steps of receiving a message including last timestamp information from one or more evolved Node Bs (eNBs) in a broadcast service area;
    determining one or more offsets of a system frame number, wherein each of the one or more offsets is determined using the last timestamp information from each of the one or more eNBs;
    transmitting a greatest offset among the determined one or more offsets as a new offset to the one or more eNBs; and
    receiving, from a broadcast server, information indicating a specific broadcast service session, wherein the information indicating the specific broadcast service session uses minimum waiting time information included in a session start message transmitted by the broadcast server, and the minimum waiting time information is set to zero (0).

2. The method of claim 1, further comprising transmitting a message requesting the last timestamp information to the one or more eNBs, upon receiving a session start message including a minimum waiting time for transmission of broadcast data is received from a broadcast server.

3. The method of claim 1, wherein packets that have been received at the one or more eNBs are discarded before the new offset is applied.

4. The method of claim 1, wherein the one or more eNBs belong to a same broadcast service area in which a same broadcast service is provided, and the one or more eNBs are synchronized with each other.

5. The method of claim 1, wherein the information indicating the specific broadcast service session uses separate parameter or flag information that is included in a session start message transmitted by the broadcast server.

6. The method of claim 1, further comprising:
upon receipt of the information indicating the specific broadcast service session, receiving at least one empty packet carrying no broadcast data, from the broadcast server.

7. A server in a wireless communication system supporting a broadcast service, the server comprising:
a communication interface configured to transmit and receive messages for provision of the broadcast service, and to transmit broadcast data; and
a controller configured to:
receive a message including last timestamp information from one or more evolved Node Bs (eNBs) in a broadcast service area;
determine one or more offsets of a system frame number, wherein each of the one or more offsets is determined using the last timestamp information of each of the one or more eNBs;
transmit a greatest offset among the determined one or more offsets as a new offset to the one or more eNBs; and
receive, from a broadcast server, information indicating a specific broadcast service session, wherein the information indicating the specific broadcast service session uses minimum waiting time information included in a session start message transmitted by the broadcast server, and the minimum waiting time information is set to zero (0).

8. The server of claim 7, wherein the controller is further configured to transmit a message requesting the last timestamp information to the one or more eNBs, upon receiving a session start message including a minimum waiting time for transmission of the broadcast data, from a broadcast server.

9. The server of claim 7, wherein packets that have been received at the one or more eNBs are discarded, before the new offset is applied.

10. The server of claim 7, wherein the one or more eNBs belong to a same broadcast service area in which a same broadcast service is provided, and the one or more eNBs are synchronized with each other.

11. The server of claim 7, wherein the information indicating the specific broadcast service session uses separate parameter or flag information that is included in a session start message transmitted by the broadcast server.

12. The server of claim 7, wherein upon receipt of the information indicating the specific broadcast service session, the controller is further configured to receive at least one empty packet carrying no broadcast data, from the broadcast server.

* * * * *